W. F. C. REIMERS.
FISH STRINGING DEVICE.
APPLICATION FILED APR. 15, 1921.
1,407,221.
Patented Feb. 21, 1922.
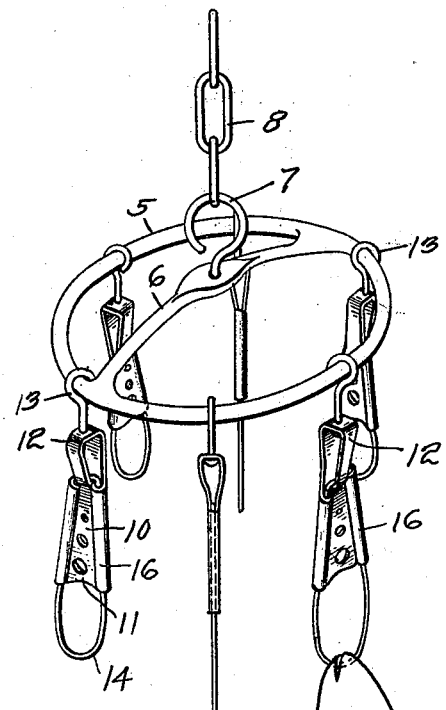
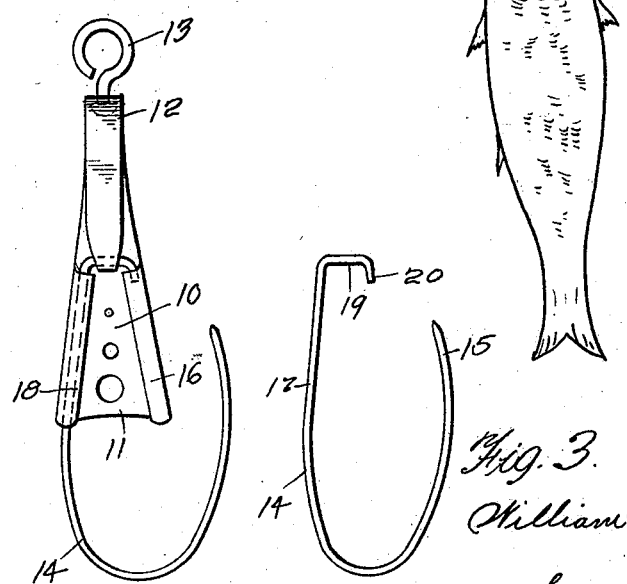
Inventor
William F. C. Reimers
By Samuel Herrick
Attorney

UNITED STATES PATENT OFFICE.

WILLIAM F. C. REIMERS, OF PAULLINA, IOWA.

FISH-STRINGING DEVICE.

1,407,221.　　　　　Specification of Letters Patent.　　Patented Feb. 21, 1922.

Application filed April 15, 1921. Serial No. 461,724.

*To all whom it may concern:*

Be it known that I, WILLIAM F. C. REIMERS, a citizen of the United States of America, residing at Paullina, in the county of O'Brien and State of Iowa, have invented certain new and useful Improvements in Fish-Stringing Devices, of which the following is a specification.

This invention relates to a fish stringing device and it has for its object to provide a structure comprising a flexible support, a rotative disc supported therefrom and a plurality of fish engaging hooks, each mounted for independent swiveling movement with respect to the rotative head.

Devices of this nature are sometimes employed by fishermen for keeping fish alive as long as possible and to that end the fish are strung upon the individual stringers and allowed to remain in the water. Where the individual stringers or hooks are unyieldingly mounted with respect to the elements to which they are connected, the twisting of the fish in their struggles to escape frequently results in their breaking loose. The present invention is particularly designed to permit universal movement of the fish in all directions, while at the same time the fish will not be able to bring any such twisting strain to bear upon the jaws as will result in the jaws being torn out with the consequent escape of the fish.

While the device has particular utility along the line indicated it is also adapted as a display device by means of which any individual fish may be brought forward for inspection and turned to varying positions after being brought directly before the observer.

Further objects and advantages of the invention will be set forth in the detailed description which follows.

In the accompanying drawing:

Fig. 1 is a fish stringing device constructed in accordance with the invention;

Fig. 2 is a side view of one of the hooks; and

Fig. 3 is an edge view of one of the hooks.

Like numerals designate corresponding parts in all of the figures of the drawing.

Referring to the drawing 5 designates a ring like edge which is spanned by a bar 6 and this bar is traversed by the lower end of an eye bolt 7 upon which the ring is mounted for bodily rotation. Any suitable supporting means, such as a rod, wire or chain, indicated at 8 may be used and connected to the eye bolt, though I prefer a flexible support or connection, such as a chain or flexible cord.

The individual stringers or hooks comprise sheet metal body portions 10 comprising the downwardly flaring aprons 11 and the loops 12. Eye bolts 13 which embrace the ring 5 and the lower ends of which pass through the loops 12 and have swivel connection therewith, serve to support the individual stringers for universal movement with respect to the ring. The fish are strung upon pins 14 bent to U form and having free ends 15 adapted to engage beneath the overturned edges 16 of the aprons, and shanks 17 which are clipped beneath the overturned edges 18 of the aprons 11, the upper ends of said shanks being bent to inverted U shape, as indicated at 19 and their extremities 20 projecting beneath the overturned edges 16, whereby the pins are held against twisting out of parallelism with the aprons 11.

It is to be understood that the invention is not limited to the precise construction set forth but that it includes within its purview whatever changes fairly come within either the terms or the spirit of the appended claims.

Having described my invention, what I claim is:

1. A fish stringer comprising a vertical supporting element, a head mounted for rotation in a horizontal plane upon said supporting element and a plurality of stringers connected to said head and mounted for swiveling movement with respect to said head.

2. A device of the character described comprising a flexible vertical support, a ring pivoted to rotate in a horizontal plane with respect to said support and a plurality of stringers engaged about the periphery of said ring and having swiveling movement with respect to said ring.

3. A fish stringer comprising a vertical supporting strand carrying a bolt at its lower end, a ring, a bar spanning the ring and traversed by said bolt whereby the ring is mounted for bodily horizontal rotation upon said bolt and a plurality of fish stringers comprising portions adapted to engage the fish and portions slidable upon said ring, the first named portion being mounted for swiveling movement with respect to the last named portion.

In testimony whereof I affix my signature in the presence of two witnesses.

WILLIAM F. C. REIMERS.

Witnesses:
ETHEL TJOSSEM,
A. P. SCOTT.